United States Patent [19]
Schmid et al.

[11] Patent Number: 6,106,263
[45] Date of Patent: Aug. 22, 2000

[54] EXTRUDER FOR MANUFACTURE OF SHAPED BODIES FROM PLASTICS-FILLER MIXTURES HAVING HIGH FILLER CONTENT

[75] Inventors: Manfred Schmid, Augsburg; Ernst Tetzlaff, Heidenheim, both of Germany

[73] Assignee: SGL Technik AG, Germany

[21] Appl. No.: 09/041,322

[22] Filed: Mar. 12, 1998

Related U.S. Application Data

[62] Division of application No. 08/749,221, Nov. 14, 1996, Pat. No. 5,804,116.

[30] Foreign Application Priority Data

Nov. 16, 1995 [DE] Germany ............... 195 42 721

[51] Int. Cl.[7] .................. B29C 47/80; B29C 47/86
[52] U.S. Cl. ............. 425/144; 425/204; 425/379.1
[58] Field of Search ................... 425/144, 204, 425/378.1, 379.1, 381, 382.3, 461, 467

[56] References Cited

U.S. PATENT DOCUMENTS

| | | | |
|---|---|---|---|
| 4,365,946 | 12/1982 | Anders | 425/382.3 |
| 4,798,696 | 1/1989 | Boen Per | 425/382.3 |

FOREIGN PATENT DOCUMENTS 4235430   4/1994   Germany .

OTHER PUBLICATIONS

Patent Abstracts of Japan 05042582 Furukawa Electric Co. Ltd., Kojima Shinji, Feb. 23, 1993.

*Primary Examiner*—Harold Pyon
*Assistant Examiner*—Joseph Leyson
*Attorney, Agent, or Firm*—Connolly Bove Lodge & Hutz

[57] ABSTRACT

An extruder forms shaped bodies from plastics-filler mixtures having a filler content of more than 50% by volume. The extruder comprises a product feed device, an outer mouthpiece and two barrels arranged coaxially between the product feed device and the outer mouthpiece. The first barrel (input cone) having an inside wall provided with grooves essentially parallel to the longitudinal extent of the barrel is connected with the product feed device. The second barrel (output zone) is connected with the outer mouthpiece. A screw arranged in the first barrel conveys material into the second barrel. Separate tempering arrangements for the first barrel, for the second barrel and for the mouthpiece control the desired operation temperatures in the extruder. Preferably, the extruder additionally includes a mandrel connected with the screw and arranged in the second barrel.

6 Claims, 2 Drawing Sheets

EXTRUDER FOR MANUFACTURE OF SHAPED BODIES FROM PLASTICS-FILLER MIXTURES HAVING HIGH FILLER CONTENT

CROSS-REFERENCE TO RELATED APPLICATION

This application is a division of application Ser. No. 08/749,221, filed Nov. 14, 1996, now U.S. Pat. No. 5,804,116, filed Sep. 8, 1998.

BACKGROUND OF THE INVENTION

The invention concerns a method for the manufacture of shaped bodies by extrusion moulding of plastic-filler mixtures containing more than 50% by volume of fillers and to an extruder for carrying out the method.

The property profile of plastics can be changed and as a rule improved by the addition of fillers. Improvements of this type concern, for example, the processability of the plastics or the properties of the products manufactured from such plastic-filler compositions such as E-modulus, impact strength, dimentional stability or heat resistance. As long as the content of fillers does not exceed a stipulated amount, no problems occur in the shaping of the plastic-filler materials to intermediate or end products. Above a specific content of fillers, the flow qualities of such materials however degrade increasingly and their processability becomes increasingly more difficult. This has especially problematical effects on extrusion moulding. With high filler contents, the limiting transverse stresses necessary for generating a shearing flow rapidly become disproportionally high and very high forces are necessary for the extruding. Extrusion of this type can only be handled with a correspondingly expensive machine tool equipment, that is with special machines, and in many cases such materials generally cannot be extrusion moulded. Plastic materials with high filler contents have, moreover, a low melt dilatability. On emergence from the nozzle moulding tool, damage like tearing or roughening or scaly surfaces therefore occurs, in particular with the extrusion moulding of flat bodies or even of tubes.

SUMMARY OF THE INVENTION

The object underlying the invention, at least for a group of such plastics containing high contents of fillers, is to make available a method and an apparatus with whose help manufacture of defect free shaped bodies, in particular of tubes or thin plates, but also of other profiles, is possible by extrusion moulding from such materials.

The object is solved by a method according to the present above-identified invention and by the making available of an extruder. In the respective claims which follow, advantageous embodiments of the invention are indicated. The texts of the claims are accordingly incorporated into the description of the invention.

DETAILED DESCRIPTION ON THE INVENTION

The invention concerns plastic-filler mixtures in which the filler contents have a good thermal conductivity. Moreover it is restricted to plastic-filler mixtures with filler contents of more than 50% by volume of filler related to the plastic mixture=100%. According to a preferred variant, compositions of filler contents of more than 6% by volume, and especially preferably those of 75% by volume and more, are processed. Plastic-filler mixtures with filler contents above 95% by volume are no longer workable even by the described method.

Fillers for materials workable by the method according to the invention are in particular non-graphitic and graphitic carbon like coke, carbon black, synthetic and natural graphite, ground carbon reinforced with carbon fibres (CFRC) or ceramic materials like silicon carbide (SiC), SiC infused with silicon (SiSiC), boron nitride (BN) and titanium oxides of the type TiO, with n less than 0.5 or comminuted plastic reinforced with carbon fibres or metals, insofar as these are chemically compatible with the plastic of the material pairing provided. Preferably, granular and fibrous carbon-containing fillers and graphitic products manufactured in particular synthetically from these are used. Fillers made from CFRC and CFRP are obtained by grinding of shaped parts formed of CFRC or CFRP. They consist as a rule of a mixture of carbon fibres, matrix substance and reinforced material remaining intact. The filler component employed can also consist of mixtures of several fillers.

The dimensions of the particles used as fillers should not exceed the region of a few millimeters. Granular/pulverous filler particles have preferably a largest linear measured particle size of not more than 1 mm. This holds in general also for fibrous filler particles. Nevertheless here it is suitable in many cases to work with fibres up to lengths of about 5 mm. Naturally, even larger filler particles can be mixed into the plastic, although this has the consequence that these particles become comminuted on grinding in method step 2. They are then no longer completely encased in plastic. In the presence to a large extent of broken surfaces not covered in plastic at the filler particles, especially with high filler contents, difficulties can occur in the later extrusion moulding.

All thermoplastic and thermosetting plastics as well as elastomers are suitable for the working according to the method of the invention, insofar as they have a sufficient temperature resistance for the working in softened state. Plastics employed are preferably thermoplastically processable fluorine-containing polymers such as co-polymers of tetrafluoroethylene with perfluoropropylene (FEP), co-polymers of tetrafluoroethylene with perfluoroalkylvinylethers (PFA), co-polymers of ethylene and tetrafluoroethylene (ETFE), polyvinylidene fluoride (PVDF), polychlorotrifluoroethylene etc., polyolefines like polyethylene or polypropylene, cycloolefine co-polymers like norbylideneethylene co-polymers and other co-polymers of this type manufactured with metallocene catalysts, polyamides, thermoplastically workable polyurethanes, silicones, novolaks, polyaryl sulfides like polyphenylenesulfide (PPS), polyaryletherketones which have a permanent temperature resistance according to DIN 51 005 of at least 80° C. Plastics having a polyvinylidene and cycloolefinbasis are preferably used. Also, mixtures of plastics combinable with one another can be used if this is advantageous for example for improving the processability or the optimising of the product properties.

For carrying out the first method step, the plastic and the filler components corresponding to the specified charge are put into a heatable mixer and mixed there at least at the melting temperature of the plastic components, preferably at temperatures at which the plastic has a low viscosity sufficient for the mixing procedure, until the plastic is melted and the filler particles are distributed uniformly over the entire mixture. Should it be necessary or important for the carrying out of one or several of the method steps for the properties of the end product, auxiliary materials like stabilizers, wetting agents, pigments, plasticisers or lubricating aids can be added to mixture before or during the mixing process. Suitable as mixers are all discontinuously or continuously operating mixers which are able to work pseudoplastic materials which are very highly viscous as a consequence of large filler contents. Coming into question here preferably are temperable, mostly only heatable, paddle or Z-arm kneaders with or without piston ram, or, for large amounts, e.g. double screw kneaders of the ZSK type or Ko-kneaders. It is also possible to generate the energy required for the heating up of the material mechanically by use of mixing parts as a result of shearing forces in the product to be mixed, although this method is generally not sufficient on account of the high heat loss resulting from the good thermal conductivity of the filler content. After the mixing, the mixture is removed from the mixer and allowed to cool.

In order to bring the plastic-filler mixture into a suitable form for the extruding, in the third step of the method of the invention, it is comminuted to particle sizes, or is graded after the comminution, to particle sizes, which enable a working according to method step 4. For that, the material is initially broken up, where necessary, and then ground. In general, the material has however a consistency which permits an immediate supply to a mill. Machines like pin beater mills or hammer mills acting by means of impact action and which are especially suited for averagely hard to soft specified charges are preferably used for comminution. In this method step, for reasons of economy, one should strive to keep low the content of finely particulate fraction of below 0.1 mm since too high a finely particulate content can hinder the degassing in the subsequent working in the extruder. It is therefore provided, in known manner, that the grinding equipment is coupled with a grading arrangement and only the coarse particle component which preferably has a particle size of >1 mm is returned for further comminution in this arrangement. Where it is favourable, the limit for the establishment of the coarse particle range can even be displaced to larger values. According to a preferred variant of the invention, particles in the range of between 0.1 and 0.315mm are used for the extrusion moulding. According to another preferred variant, a material to be mixed which has been coarse crushed in suitable manner is charged to a mill, the material is ground down in this by a "bulk grinding", after which, should it be necessary, the fine grain part of it lying below 0.1 mm mesh is reduced by grading to a content of less than 25% by weight and this bulk ground material is supplied to the fourth method step.

The plastic-filler mixture obtained by the third method step, comminuted and possibly graded, is remelted in the fourth method step and extrusion moulded to form profiles. For carrying out this method step, an extruder with conveying input zone, also termed as extruder, with grooved input zone or grooved barrel extruder or grooved extruder, is used. The characteristic of this type of extruder is the provision of longitudinal grooves in the cylinder wall, the grooves being provided essentially parallel to the longitudinal extent of the screw in the entry zone of the extruder, which grooves end conically as a rule at the end of the entry zone, seen, that is, in the conveying direction. The cross section of the grooves is conventionally rectangular, but it can, depending upon special technical circumstances, also have other forms. The process technology speciality of this type of extruder is that the bulk charge introduced into the input and conveyor chamber of the extruder keys form fittingly into the grooves, whereby the coefficient of friction of the material increases strongly at the cylinder wall and accordingly a displacement of the material in the peripheral direction is made impossible. The material is therefore conveyed practically exclusively in the axial direction as a result of the forces acting over the thrust surfaces of the screw. In the procedure according to the state of the art, the material is cooled or only slightly tempered in the grooved input zone, because it is not to form any melt film on the cylinder wall. Nevertheless, should this occur, the advancing of material would be brought to a standstill because the coefficient of friction material/barrel wall will become too low with respect to that of the pairing screw/material and the material would only continue to go round and round in the cylinder of the input zone as a consequence of this. In contrast, with the method according to the invention, the grooved barrel, and where it is required, also the screw is adjusted by suitable heating arrangements to a temperature which, in the case of amorphous plastic, is above the glass transition temperature and, in the case of partly crystalline plastics, above the crystalline melting range of the plastic used. As a result, the granular plastic-filler material introduced into the input zone of the extruder is heated by heat transfer from the surfaces of the cylinder of the input zone, and possibly the screw, which could be contacted by the material and by the friction at the aforementioned surfaces being generated with the advancing procedure in the input zone and the material is compacted at the it i s not necessary to heat the end of this zone. In general, it is not necessary to heat the screw and, with especially strong friction between the material and the surface of the screw, it can even be possible that heat must be removed via the tempering arrangement of the screw. With the conveying and compacting procedure taking place in the input zone, it is necessary for care to be taken, for example by means of a suitable gradation of grain sizes of the material supplied to the input zone, that the material is de-aerated sufficiently, that is that the gas located in the charged material can be vented in the direction of a venting opening, for example the feed pipe. As a consequence of the good thermal conductivity of the plastic-filler material according to the invention, a good heating up of the material to be processed is largely achieved, although a pure plug flow is present and practically no dissipation energy is introduced to the material. On account of this good compaction and heating through already at the end of the input zone, the plasticizing or compression zone in which takes place a further homogenisation of the material can follow the input zone comparatively shortly. According to the invention it is also not necessary to provide in this zone, besides a normal screw formation, special shearing or kneading elements. At the transition from the input zone to the plasticising/ homogenising zone, however a thermal barrier must be present. By thermal barrier is meant a thermal insulation of the heater(s) and, so far as is technically possible, all the heat transfer elements between the processing zones of concern. It is thus possible to match the temperature of the material located in the extruder individually to the requirements in the separate processing zones. In this second processing zone, the temperature control must be so adjusted that the material is continuously thermally homogenised.

The output zone carrying at its end the nozzle shaping tool or mouthpiece follows the plasticising/homogenising zone, which is constructed according to the state of the art. It must be equipped with a controllable heater in order to be able to set optimum temperature conditions from the extrusion moulding procedure. Also, between the plasticizing/ homogenising zone and the output zone there is provided a thermal barrier. In the output zone, the material plasticized and thermally homogenised in the previous steps is to be removed by means of the pressure built up onto the mouthpiece at the mouth piece-side end of the input zone and shaped by this to a shaped extrudate. For full-section profiles, mouthpieces of usual constructional form are used. For the extrusion moulding of tubes, mouth pieces with a webless heatable mandrel are employed. The mandrel is here formed as an extension of the screw of the extruder and rotates with this. It is equipped with one of the controllable heaters known from the state of the art, by means of which a mandrel temperature can be adjusted which guarantees as low as possible a co-efficient of friction between the material to be extruded and the mandrel surface. Should it be necessary, the wall inside of the tube mouthpiece, similarly to the inner wall of the cylinder of the input zone, is provided with longitudinal grooves running in the direction of the mouthpiece opening in order to prevent rotation of the material in the mouthpiece. Mandrels held by means of webs in the mouthpiece cannot be used for the aforementioned plastic-filler material since the material flowing through the mouth piece is divided at the webs and as a consequence of its low capacity for melt working would not become connected with one another again, at least not again perfectly, beyond the webs.

With plastic-filler materials with especially high contents of fillers or those with relatively large filler particles, there remain after the comminutions carried out in the third method step, "free" break surfaces not covered with plastics. These break surfaces can be causes of deficient flow behaviour of the material in the extruder and for a bad capacity of the plastic-filler material to bind with one another or be coherent. Difficulties of this type can, where this is made possible by the properties of the later manufactured product, be met by supplying to the comminuted or comminuted and graded material the same type of plastic, preferably in finely divided form in an amount which corresponds approximately to the covering requirement of the surfaces of the filler particles existing free as a result of the comminution. Moreover, the necessary amounts of plastic to be added amount to up to 80% by weight related to the plastic-filler material provided for the extrusion. Which amounts must be used exactly must be determined from case to case by the man skilled in the art by means of simply carried out extrusion experiments.

The low melt workability or melt extendability of the materials processable in this process also does not allow the extrusion moulding of relatively wide webs or plates with a small ratio of height to width, that is of flat webs or plates to take place e.g. through a wide slit nozzle, since faults arise on extrusion, especially cracks extending from the middle of the plates. Manufacture of webs or plates of this type is possible nevertheless according to a variant of the invention if the material is extruded through a mouthpiece for the extrusion moulding of a hollow profile having curved outer and inner contours and the wall of the hollow extrudate emerging from the mouthpiece, as long as this is still deformable, is split at at least one side along its entire length and the cut hollow extrudate is bent flat to form a web and this is cut through, possibly afterwards, to plates of desired length. Clearly, plates can also be manufactured according to this method by splitting the walls of corresponding hollow profiles at a later time along their length and shaping the bodies thus obtained into plates. Certainly then the hollow profile or the cut hollow profile must first of all be heated again to the shaping temperature. A similar method for the manufacture of webs or plates together with the extruding of hollow profiles has been previously described in JP-OS-06-060886. Different to the method according to the invention described here, necessary for the manufacture of extrudable materials in the named specification is always the addition of solvents, disperants or special binders which must first of all be removed by drying/vaporisation after the shaping.

Plates or webs which have been manufactured according to the present invention can be provided on either one or both surfaces with a profile. Should it be convenient, this happens directly in association with the passing out from the extruder as long as the web still has a sufficient plasticity, thus is in the hot state. According to one possibility, moreover, the profile is impressed by pressing a heated embossing roller(s) acting on the extruder web or on the plates with one on one side or with two rollers from opposite sides, according to whether the embossing is only to be employed on one side or on both sides of the surface. According to another method, heated embossing stamps are used which can act on one or both sides or which impress the profile in a matrix whose base carries possibly a counter-profile. Still further processes for the incorporation of a profile are known and used by the man skilled in the art. For example, the profiles can be worked on programme controllable operating machines even after the complete solidification of the webs or plates by machine working. According to a further variant of the invention, one or both surfaces of the web or of the plates can be provided with a coating which lends to the surfaces special, for example electrical, chemical, mechanical, optical or colour properties. Here, especially preferred is the application of a catalytically, in particular an electrochemically acting catalytic layer which contains or consists of for example metals or metal compounds of elements of the VIIIth sub-group of the periodic system of the elements or electrically semi-conducting substances. According to a further advantageous variant of the invention, the coating is provided at the same time as the embossing procedure, for example by having an application devices like rollers, brushes or spray arrangements, connected after or prior to the embossing step, or it takes place by means of the embossing tool itself.

In the method described as aforesaid, an extruder is used which is known in principle in plastic working is technology. The invention consists in the combination of the features of the method procedure with the technical construction of the extruder specially matched thereto.

According to an especially preferred variant of the invention, the method is carried out with use of a modified grooved barrel extruder which consists merely of two zones between the product feed devices and the outer mouthpiece end, namely the input zone and the output zone carrying the nozzle shaping tool. Arrangements like filling hoppers, belt weighers etc. known to the man skilled in the art can be used as product feed devices. As with known machines with conveying input zones, here too the cylinder is equipped in the input zone on the product guiding side with longitudinal grooves which effect in the previously described manner, in cooperation with the screw, an automatic conveying of the material conveyed via the feeding arrangement into the input zone. The screw ends at the end of the input zone. Only the shaft of the screw extends to some extent into the output zone. In the case of the extrusion of tubes, it is guided to a mandrel at its furthest up to the end of the mouthpiece, with reduction in its external diameter. The shaft of the screw and in particular its part located in the output zone are provided with a tempering, preferably a heating arrangement. The output zone follows the input zone without connecting in between a special plasticizing, homogenising or compression zone. It is however important for carrying out the method that between the input zone and the output zone there is provided a thermal barrier. By means of this, the temperature pattern in the two zones can be controlled independently of one another. If for example the temperature of the material at the process-side end of grooved barrel zone would become too high, e.g. as a result of the friction taking place there, sufficient heat must be removed in the zone that the material is not damaged. However, the temperature of the material must be kept sufficiently high in the output zone which follows for this to be sufficiently fluid so that a regular pressing-out is guaranteed. It must thus be heated there. In carrying out the method, the plastic-filler material is taken up in the input zone and during its transport is compressed increasingly in the direction of the output zone subject to continuing de-aeration. At the process-side end of the input zone, the material is then practically completely de-aerated and the pressure controlling it reaches its maximum. The material is conveyed into the output zone under this pressure and is extruded therethrough the mouthpiece subject to "pressure loss". On account of the great compaction of the material already at the end of the input zone, care must be taken that the leading away of the gases located in the granular delivery feed, in general air, is made certain in the input zone. Apart from measures appertaining to apparatus known to the man skilled in the art, this happens as a result of the suitable choice of particle composition of the supplied feed, described in the foregoing. A special feature here is to maintain use of a not too high fines content. Differing from the extrusion method according to the state of the art, according to a preferred method variant of the invention, the mixture stipulated for extrusion is already heated in the input zone to temperatures above the melting range of the plastic used as matrix material. By the term melting range is understood, with plastic with crystalline components, the range of the crystallite melt temperatures and, with amorphous thermoplasts, the glass temperature. The material may not however be heated so high that, in the input region, there is formed on the cylinder wall a low viscosity film of plastic melt on which the remaining plastic-filler material can slide. In such a case, any conveying of material in the conveyor might come to a standstill. The temperature rise and heating through of the material in the extruder takes place both in the input and also in the output zone by heat transfer from the surfaces of the heated cylinder and possibly the screw or from those surfaces of the casing located in the output zone and the mandrel, by the friction of the material on the surfaces of the previously indicated components of the equipment and by the good thermal or temperature conductivity of the material. A heating increase by dissipation does not takes place in practice. Where overheating of the material could occur there as for example at the end of the input zone before the thermal barrier to the output zone, a possibility for the removal of heat from the material must be provided.

The extrudates manufactured according to one of the method variants described in the foregoing have, besides the properties resulting from their composition of stipulated plastic and fillers, good thermal conductivity and electrical conductivity properties. They are therefore preferably used as components for heat exchangers, for electrodes which are thermally lightly loaded, for example in electrochemical detection or separation methods like electrolysis, in batteries or in fuel cells or for electrical purposes like heating elements or components for screening of electrical fields or for the dissipation of electrical charges. Plates manufactured according to the invention are used preferably for heat exchangers and plates equipped with catalytically active coatings are preferably used for fuel cells.

In the following, the invention is explained further by means of explanatory examples:

EXAMPLE 1

For the manufacture of the plastic-filler mixture, 768 g of ground electrographite, particle fraction 0.04 to 0.20 mm, 432 g of ground electrographite, particle fraction less than 0.01 mm, and
300 g of PVDF granulate, Solef 1010 type from Solvay-Kunststoffe GmbH, corresponding to 76.6% by volume (80% by weight) filler content and 23.4% by volume (20% by weight) plastic component
were kneaded in a piston ram mixer, LDUK1 type, manufacture Werner & Pfleiderer, for 10 minutes at a temperature of 230° C. while subject to piston ram loading.

After discharge from the mixer and cooling, the material was ground in a fine impact pulveriser, UPZ24 type, manufacturer Hosokawa Alpine AG, and fractions less than 0.1 mm and 0.1–0.315 mm were screened from the ground product. Then a homogenised mixture of 15% by weight of the particle fraction of less than 0.1 mm and 85% by weight of the particle fraction of 0.1 to 0.315 mm was extruded by means of an extruder according to the invention consisting, with reference to the parts contacted by the product, merely of supply arrangement, input zone and output zone (inclusive of mouthpiece), extrusion taking place through a tubular mouthpiece with a casing internal diameter of 27 and a mandrel external diameter of 25 mm. The mandrel was not held by webs, but was connected, as one, with the conveyor screw of the input zone. The extruder was equipped with a single thread screw having a diameter of 30 mm, a pitch of 15 mm ($\hat{=}0.5$ d) and a pitch depth of 2.5 mm. The casing inside of the cylinder of the input zone had, seen from the middle of the supply hopper, six 90 mm long ($\hat{=}3$ d) conically extending rectangular grooves with an inclination of 2° 11 minutes in the direction of the output zone. The input zone was tempered as 210° C., the output zone at 240° C. The tubular extrudate was continuously cut at one side during the emergence from the mouthpiece by a knife secured at the end of the mouth piece and was bent flat to a web. Then the web was cut into plates having a length of 100 mm and the plates thus obtained were provided on its sides with longitudinal and transverse grooves in a roller embossing arrangement with a temperature of 230° C. The plates had the properties denoted in Table 1, under Example 1. After the finishing, they were used as bipolar electrodes in a fuel cell.

EXAMPLE 2

For the manufacture of a plastic-filler mixture, the following components were kneaded in a driven kneader with sigma-paddles initially for 15 minutes at 220° C. without exertion of pressure by a ram and then for a further 5 minutes at the same temperature with pressure applied by a ram:
835 g of electrographite, particle fraction of 0.04 to 0.2 mm
470 g of graphite powder KS 75, manufacturer, Lonza AG and
195 g of COC-plastic (cycloolefinpolymer), COC 5013 type, manufacturer Hoechst AG, corresponding to a plastic content in the overall mixture of 24.3% by volume (13% by weight).

After emergence from the mixer and being allowed to cool down, the material present in the form of pellets was ground on a pin beater at room temperature and the ground material was graded. Then a homogenised mixture of 24.75 parts by weight of the particle fraction of less than 0.1 mm, 74.25 parts by weight of the particle fraction 0.1 to 0.315 and 1 part by weight of plastic-based pressing auxiliary, PED 153, manufacturer Hoechst AG was extruded in an extruder, in principle as described in Example 1, through a tubular mouthpiece having the same measurements as in Example 1. Differing from Example 1, however, a double screw with a screw pitch of 30 mm was used. The temperature of material in the output zone amounted to 260° C. As previously described in Example 1, the curved surface of the tubular extrudate was cut continuously down one side in the longitudinal direction on emerging from the mouthpiece and the former tube was bent flat to a flat extrudate on a support tempered to 240° C. The plates obtained then from the extrudate by cutting and having a length of 80 mm were provided by an embossing tool with a grooved profile in a die press with heatable die at a temperature of 250° C. under a pressure of 150 bar. The physical characteristics of the plates thus obtained are to be seen from Table 1, under Example 2. Plates of this type were used as electrodes for electrolysis purposes.

EXAMPLE 3

For the production of the extrudable mixture, in this case 82% by weight of electrographite, particle size less than 0.5 mm were mixed with 18% by weight ($\hat{=}$28% by volume) of novolak powder of 222 SP type, manufacturer Bakelite AG, flow limit at 125° C., 55 to 70 mm (DIN 16916-02-A), which contained 8% by weight of hexamethylenetetramine as hardener, in a Z-Arm-Kneader at room temperature. After emergence from the mixer, the mixture was extruded in an extruder as has been described in Example 1 and through a mouthpiece for the manufacture of tubes at a mouthpiece temperature of 80° C., the mouthpiece having measurements 25 mm external diameter and 22 mm internal diameter. The tubular extrudate emerging from the mouthpiece was then separated lengthwise into two equal halves by means of a cutter exceeding the external diameter of the tube and attached directly to the mouthpiece but not connected with the central mandrel of the mouthpiece, and these halves were bent flat to form strips and then cut to plates 100 mm in length. The space in front of the mouthpiece in which the aforementioned manufacture of the plates took place was tempered to about 75° C. by means of a heated table. The plates thus produced were reshaped in a die press at a temperature of 120° C. and a pressing force of 100 bar to ribbed electrodes and then finally hardened at 180° C. The physical characteristics of the plates thus produced are indicated in Table 1, under Example 3.

EXAMPLE 4

For the manufacture of the plastic-filler mixture, 1408 g of commercially available titanium powder, titanium content 99.9%, particle size up to 0.150 mm (up to 100 mesh) were kneaded in a nitrogen atmosphere with 80 g$\hat{=}$5.4% by weight or 22% by volume of a polypropylene granulate, Eltex PTL 220 type, manufacturer Solvay Kunststoffe GmbH in a Z-Arm-Kneader equipped with piston ram while subject to piston ram loading. After emergence from the mixer and after being allowed to cool, the mixture was ground in a slowly operating impeller mill, likewise under nitrogen as protective gas against danger of ignition and explosion, and the fraction of less than 0.4 mm was separated off for the subsequent extrusion. This extruding was carried out by means of an extrusion arrangement according to Example 2 having a tubular mouthpiece for tubes having the measurements, external diameter 25 mm, internal diameter 22 mm, which was heated to a temperature of 220° C. and whose mandrel was likewise kept at a temperature of 220° C. The tubes manufactured in this way were employed, after a mechanical finishing, as measuring electrodes for potential measurements. The physical characteristics of such tubes are indicated in Table 1, under Example 4.

EXAMPLE 5

For the manufacture of the plastic-filler mixture, 1430 g of copper fibres, diameter 10 μm, length 2 mm, were mixed with 70 g$\hat{=}$4.5% by weight or 20% by volume of PVDF powder, Solef 1010.6001.1 type, manufacturer Solvay-Kunststoffe GmbH, at room temperature with a stirrer blade, like that used also in domestic mixers. The mixture thus obtained was thereupon extruded by means of an extrusion arrangement according to Example 1 with a mouthpiece temperature of 240° C. to form a solid extrudate of thickness 1.5 mm, width 10 mm. After the cutting up of the extrudate to the respective desired lengths, the strips thus obtained were used as potential compensators. The physical characteristics of this product are to be seen from Table 1, under Example 5.

In the following, the invention, in particular the arrangement for extruding, is explained further by way of example by means of figures in schematic representation.

Figure 1:
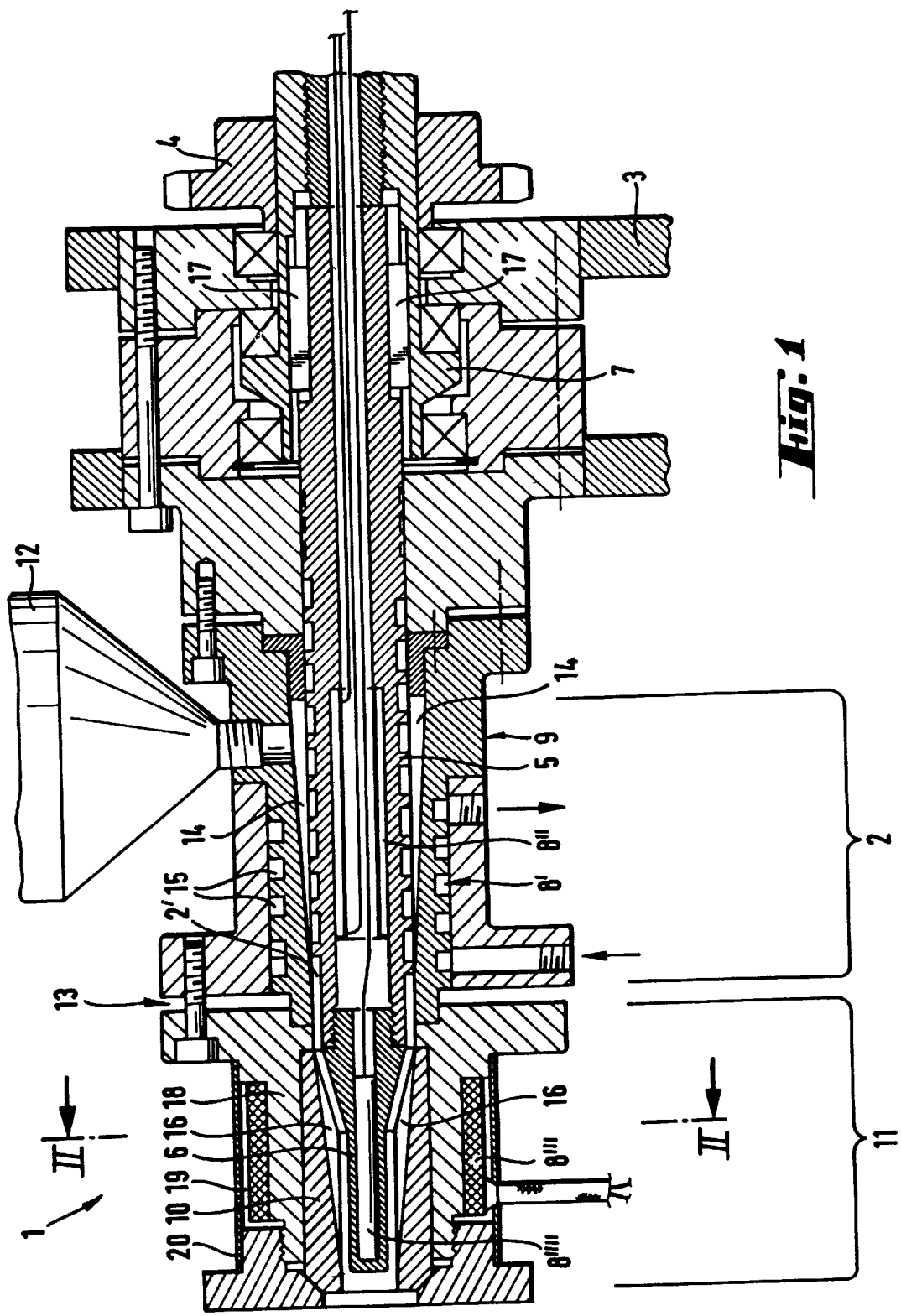
FIG. 1 shows a longitudinal section along the central axis of an extruder according to the invention having conveying input zone.
Figure 2:
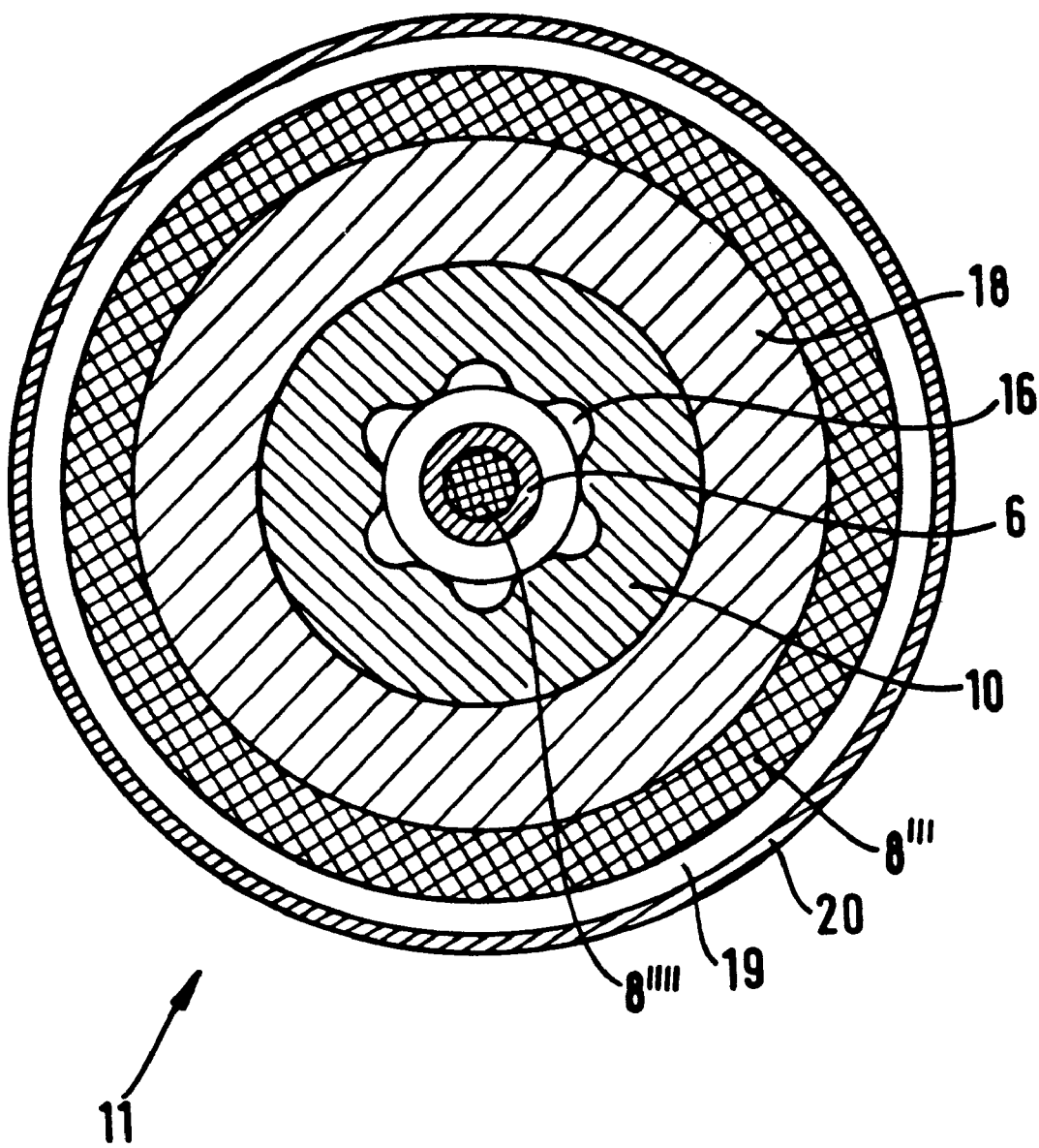
FIG. 2 shows a transverse cross-section through the input of a tubular mouthpiece with a rotating mandrel along the line II—II of FIG. 1, the mouthpiece being provided with grooves.

In FIG. 1, there is shown an extruder (1) with conveying input zone (2) (grooved barrel extruder), which consists essentially of a machine frame (3) reproduced only schematically, a likewise only schematically reproduced drive unit (4) for the shaft (7) equipped here with a toothed wheel and the shaft (7) being coupled via adjusting springs (17) to the screw (5), an output zone (11) and tempering arrangements (8),
1. for the groove barrel (9) in the input zone (2), (8'),
2. for the screw (5) in the input zone (2), (8"),
3. for the mouthpiece (10), (8'''),
4. for a mandrel (6), (8''''), located in the mouth piece (10).
The measuring and controlling arrangement likewise necessary for the operation of the extruder, as well as further peripheral arrangements like for example a removal arrangement for the extrudate are state of the art and are therefore not shown. The characteristic of the extruder (1) is that its parts contacted by product, with the exception of the supply arrangement (12) for the product to be extruded, which is shown here as a filling hopper (12), consist merely of the input zone (2) and the output zone (11). A homogenising or compressing zone is absent. A further important feature is the presence of a thermal barrier (13) between input zone (2) and output zone (11). The wall inside of the cylinder (9) of the input zone (2) is equipped with six conically extending grooves (14) of rectangular cross section at the mouthpiece end (2') of the input zone (2), of which only two are to be seen in the present representation. Furthermore, the cylinder (9) contains channels (15) for the conducting therethrough of heat conducting medium for tempering, essentially for heating, the grooved bushing (9) (tempering arrangement 8'). This tempering arrangement (8') can also consist of more than one zone in order to be able to temper material to be extruded in a more targeted manner. Optionally, the material is evenly cooled in the neighbourhood of the mouthpiece side end (2') of the input zone (2) for avoidance of harmful overheating. The single screw (5) located in the input zone (2) is internally hollow. The screw (5) can be equipped with a tempering arrangement (8″) suitable for cooling or heating and operating with a heat conducting medium. The tempering arrangement (8‴) of the output zone (11) consists of a heating jacket. The mandrel (6) provided for when extruding hollow extrudates and connected fast with the screw (5) and positioned centrally in the mouth piece (10) contains, as tempering arrangement (8″″), an electrically operated heating mandrel. Should, instead of tubes, solid profile have to be extruded, the mandrel (6) is dismantled from the end of the screw and a correspondingly suited screw discharger is installed. For the extruding, the granular to pulverous plastic-filler mixture is supplied to the input zone (2) via the supply hopper (12). After supply to the extruder, the material spreads out in the space left by the screw (5) and the grooved barrel (9) at the beginning of the input zone (2). It is pressed by the rotation of screw (5) into the grooves (14) of the grooved barrel (9) where it is keyed and as a consequence of this process is compressed increasingly for conveying in the form of a plug in the direction of the mouthpiece (10) and accordingly up to the end of the input zone (2). In parallel with this procedure, the material is adjusted to temperatures suited to the further processing by the tempering arrangements (8′ and 8″) as already described. The material is immediately forced into the output zone (11) and extruded through the mouthpiece (10) under the pressure built up by the screw (5). The material in this zone (11) is adjusted to the desired temperature for the extruding by means of the tempering arrangements (8‴ and 8″″). This is possible largely independently of the temperature of the input zone (2) because, between the last indicated zone and the output zone (11) there exists a thermal barrier (13). According to a preferred embodiment, when extruding tubular extrudates the mandrel (6) rotates with the speed of rotation of the screw (5). Should the extrudate rotate to an impermissible extent as a result of the friction between mandrel (6) and material connected with the rotation, the casing inside of the mouthpiece (10) can have, from the input side of the material over at least a part of its length, longitudinal grooves (16) extending conically in the extrusion direction which are preferably curved in cross section and, have broken edges. Such a constructional form shows the cross section through a tube mouthpiece in FIG. 2. In this Figure, in addition to the tempering arrangement (8″″) for the mandrel (6), there are to be seen a mouth piece holder (18), the tempering arrangement (8‴), an air gap (19) as well as a sheet metal cladding (20).

TABLE 1

| PROPERTIES | | | EXAMPLE 1 | EXAMPLE 2 | EXAMPLE 3 | EXAMPLE 4 | EXAMPLE 5 |
|---|---|---|---|---|---|---|---|
| Bulk density (DIN 51918) | | (g/cm$^3$) | 1.98 | 1.82 | 1.90 | 3.53 | 6.90 |
| Specific electrical resistance (DIN 51911) | In the pressing direction. | ($\Omega \cdot \mu$m) | 500 | 300 | 90 | 10 | 8 |
| | At right angles to the pressing direction. | ($\Omega \cdot \mu$m) | | | | | 70 |
| Dynamic e-modulus (DIN 51915) | In the pressing direction. | (kN/mm$^2$) | 12 | 9 | 20 | 28 | 7 |
| Bending resistance (DIN 53455, Prufk.Nr.5) | In the pressing direction. | (N/mm$^2$) | 52 | 40 | 45 | 40 | 31 |
| Linear coefficient of expansion (20° C.) (DIN 51902) | In the pressing direction. | ($\mu$m/(K · m)) | 20 | 17 | 13 | 15 | 35 |
| | At right angles to the pressing direction. | ($\mu$m/(K · m)) | | | | | 48 |
| Thermal conductivity (DIN 51908) | In the pressing direction. | (W/(K · m)) | 10 | 30 | 40 | 60 | 60 |
| Permeability co-efficient (DIN EN 51935) | At right angles to the pressing direction. | (cm$^2$/s) | $6 \cdot 10^{-6}$ | $3 \cdot 10^{-6}$ | $4 \cdot 10^{-7}$ | $8 \cdot 10^{-5}$ | $6 \cdot 10^{-5}$ |

Example 1 = 76.6% by volume Graphite/23.4% by volume PVDF
Example 2 = 74.4% by volume Graphite/23.7% by volume COC-Plastic/1.95% by volume pressing auxiliary PED
Example 3 = 72% by volume Graphite/28% by volume Novolak
Example 4 = 78% by volume Titanium/22% by volume Polypropylene
Example 5 = 80% by volume Copper Fibres/20% by volume PVDF

What is claimed is:

1. An extruder comprising a product feed device, an outer mouthpiece, and two barrels arranged coaxially between the product feed device and the outer mouthpiece, the first barrel connected to the product feed device and having an inside wall with grooves essentially parallel to a longitudinal axis of the first barrel, the second barrel connected to the outer mouthpiece, a thermal barrier at a transition from the first barrel to the second barrel, a screw arranged in the first barrel for conveying material into the second barrel, tempering arrangements for the first barrel, tempering arrangements for the second barrel, and measuring and controlling arrangements connected to the tempering arrangements for adjusting the desired operational temperatures of the extruder.

2. An extruder according to claim 1 including tempering arrangements for the screw.

3. An extruder according to claim 1 including a mandrel connected to the screw and arranged in the second barrel.

4. An extruder according to claim 3 including tempering arrangements for the mandrel.

5. An extruder according to claim 1 wherein the mouthpiece includes a casing with grooves on an inside surface thereof.

6. An extruder according to claim 1 including cooling arrangements connected to cool the first barrel in the neighborhood of the mouthpiece side end of the first barrel.

* * * * *

UNITED STATES PATENT AND TRADEMARK OFFICE
CERTIFICATE OF CORRECTION

PATENT NO. : 6,106,263
DATED : August 22, 2000
INVENTOR(S) : Manfred Schmid et al.

It is certified that error appears in the above-identified patent and that said Letters Patent is hereby corrected as shown below:

Column 1, line 65, "6% should read --65%--.
Column 4, line 24, delete "the it is not necessary to heat".

Signed and Sealed this

Twenty-fourth Day of April, 2001

Attest:

NICHOLAS P. GODICI

Attesting Officer

Acting Director of the United States Patent and Trademark Office